(12) United States Patent
Buyukkalender et al.

(10) Patent No.: US 9,252,493 B2
(45) Date of Patent: Feb. 2, 2016

(54) WIRE CAPACITOR, IN PARTICULAR FOR A RADIO FREQUENCY CIRCUIT, AND DEVICE COMPRISING SAID WIRE CAPACITOR

(75) Inventors: Arek Buyukkalender, Marseilles (FR); Christophe Bousquet, La Seyne sur Mer (FR); Frédérick Seban, Auriol (FR); Nizar Lahoui, Aubagne (FR)

(73) Assignee: GEMALTO SA, Meudon (FR)

( * ) Notice: Subject to any disclaimer, the term of this patent is extended or adjusted under 35 U.S.C. 154(b) by 182 days.

(21) Appl. No.: 14/117,921

(22) PCT Filed: May 15, 2012

(86) PCT No.: PCT/EP2012/058994
§ 371 (c)(1),
(2), (4) Date: Feb. 18, 2014

(87) PCT Pub. No.: WO2012/156392
PCT Pub. Date: Nov. 22, 2012

(65) Prior Publication Data
US 2014/0152519 A1    Jun. 5, 2014

(30) Foreign Application Priority Data

May 17, 2011  (EP) ..................................... 11305595
Jan. 31, 2012  (EP) ..................................... 12305120

(51) Int. Cl.
*H01Q 9/00*    (2006.01)
*H01Q 9/06*    (2006.01)
(Continued)

(52) U.S. Cl.
CPC ............ *H01Q 9/06* (2013.01); *G06K 19/07749* (2013.01); *H01Q 1/38* (2013.01);
(Continued)

(58) Field of Classification Search
CPC ........... H01Q 9/30; H01Q 7/08; H01Q 21/26; H01Q 7/00; G06K 19/07749; B42D 15/10
USPC ........... 343/749, 797, 866, 788; 235/488, 492
See application file for complete search history.

(56) References Cited

U.S. PATENT DOCUMENTS 5,608,417 A   3/1997   de Vall
6,088,230 A   7/2000   Finn et al.
(Continued)

FOREIGN PATENT DOCUMENTS

DE    44 10 732 A1    10/1995
EP    0 704 928 A2    4/1996
WO    WO 2011/029757 A1    3/2011

OTHER PUBLICATIONS

International Search Report (PCT/ISA/210) mailed on Jul. 11, 2012, by the European Patent Office as the International Searching Authority for International Application No. PCT/EP2012/058994.
(Continued)

*Primary Examiner* — Joseph Lauture
(74) *Attorney, Agent, or Firm* — Buchanan Ingersoll & Rooney PC

(57) ABSTRACT

The invention relates to a radio frequency device including an antenna connected to a capacitor. Said capacitor includes first and second conductive plates that are opposite each other and separated by an insulator. At least one of said first and second plates is formed of a plurality of wire capacitor portions. Said radio frequency device is different in that the antenna and at least one capacitor plate are formed with wire portions placed on a substrate in a guided manner.

11 Claims, 3 Drawing Sheets

(51) Int. Cl.
  *G06K 19/077* (2006.01)
  *H01Q 1/38* (2006.01)
  *H01Q 9/30* (2006.01)
  *B42D 25/00* (2014.01)
  *H01Q 21/26* (2006.01)
  *H01Q 7/08* (2006.01)
  *H01Q 7/00* (2006.01)

(52) U.S. Cl.
  CPC ............... *B42D 15/10* (2013.01); *H01Q 7/00* (2013.01); *H01Q 7/08* (2013.01); *H01Q 9/30* (2013.01); *H01Q 21/26* (2013.01)

(56) References Cited

U.S. PATENT DOCUMENTS

| | | |
|---|---|---|
| 6,378,774 B1 | 4/2002 | Emori et al. |
| 2011/0068992 A1* | 3/2011 | Payne ................ H01Q 1/36 343/797 |
| 2012/0286902 A1 | 11/2012 | Michalk |

OTHER PUBLICATIONS

Written Opinion (PCT/ISA/237) mailed on Jul. 11, 2012, by the European Patent Office as the International Searching Authority for International Application No. PCT/EP2012/058994.

* cited by examiner

Section A-A

WIRE CAPACITOR, IN PARTICULAR FOR A RADIO FREQUENCY CIRCUIT, AND DEVICE COMPRISING SAID WIRE CAPACITOR The invention relates to the field of capacitors. It aims in particular capacitors for radio frequency transponder circuits comprising a first and a second opposite conductive plates separated from an insulator and the transponder device comprising such a capacitor.

The capacitors covered by the invention are preferably intended to be part of a transponder circuit comprising a radio frequency coupling antenna which they are linked to. Such transponders circuits belong particularly to the field of the contactless smart card or the electronic passport. The antenna and the capacitor generally form a resonant circuit. The resonant circuit can be passive or active and be linked to a radio frequency integrated circuit chip to communicate data with a radio frequency drive.

More particularly, the invention relates to devices such as contactless chip media, contactless smart cards, labels, e-passports, devices with a passive antenna comprising a frequency tuning capacitor. The invention relates in particular to electronic contactless travel documents (e-passports and e-visas).

These devices may be in compliance with the ICAO (acronym for "International Civil Aviation Organization") specifications and/or the ISO/IEC 14443 standard.

Document U.S. Pat. No. 6,378,774 shown in FIGS. 1 and 2 discloses a smart card comprising an integrated circuit module 2 with contact and antenna communication interfaces. The card body comprises a passive antenna that comprises two coils 3, 4 linked to a capacitor 15, with a wide closed coil which can be positioned substantially at the periphery of the card body and a narrow coil positioned so as to be centred with the module antenna. The function of the wide coil is to communicate with an external drive and the function of the narrow loop is to couple and to communicate with the module.

This smart card has a disadvantage in that it has a complex construction and uses double-sided etching technologies for the capacitor and the antenna, with a step of connecting, through an insulating substrate of conductive parts positioned on opposite faces of the substrate.

One embodiment of the SPS (Smart Card Solutions) Company, which uses a contact and antenna module positioned in a body cavity of a bank smart card, is also known. This module is coupled to a passive antenna positioned on almost the entire surface of the card body. It comprises substantially concentric loops positioned in a spiral around the cavity of the module. The first loop adjacent to the cavity is several millimeters wide under the location of the module cavity, even 10 mm wide, and the following ones too in order to enable an embossing on the turns without the risk of cutting the turns during the embossing operation. In addition, the antenna is linked to metallic capacitor plates positioned on both sides of the antenna support. The last turn extends on the periphery of the card to cover as many radiofrequency fluxes from a reader as possible.

This construction has a drawback in that it entails a risk of delamination inasmuch as the plastic sheets forming the card body badly stick to the metal surfaces of the wide turns of the antenna and/or the capacitor plates formed by etching.

The invention aims to solve the aforementioned drawbacks.

In particular, it aims to simplify the construction and the production and to improve the performance of radiofrequency devices or RF transponders.

To this end, the invention relates to a radiofrequency device comprising an antenna linked to a capacitor, with said capacitor comprising a first and a second conductive plate facing each other and separated by an insulator, with at least one said first and second plates being formed by several portions of the wire conductor. It is characterized in that the antenna A and at least a capacitor plate C are formed with wire portions deposited in a guided manner onto a substrate.

In embodiments of the invention, at least one plate (or equivalent) may be distinct from the antenna turns. Preferably, the plate is located outside the path of the turns, for example, inside or outside an antenna coil.

In other alternative solutions, a wire capacitor plates (formed of wires) forms a capacitor with another plate formed by portions of the antenna wire. The wire plate (more particularly zigzag-shaped) is for example formed opposite the antenna wires preferably on the same substrate.

With these provisions, the invention makes it possible to produce transponders (contactless cards, contactless e-passport) including an antenna, more particularly of the passive type, using the wire technology thus reaching better RF performances, which had never been considered previously due to difficult implementation.

According to other features of the capacitor:
at least several wire layers forming a capacitor wire plate, are formed astride the turns of the antenna (or opposite the antenna, transversely to the plane of the substrate).
The portions of wire are deposited in a guided manner onto a substrate;
The wire portions form parallel layers or spirals; the layers or continuous paths of wire portions are preferably formed within an area forming a capacitor plate and outside the antenna turns;
the wire portions of the two plates are deposited onto the same side of the substrate;
the wire portions of the first plate cross the wire portions of the second plate so as to be substantially bound to the substrate in areas of the substrate not covered by the wire portions of the first plate;
The wire portions may be made by embroidery or inlay on the substrate;
The antenna A and at least one capacitor plate C are continuously formed using the same continuous wire;
The device constitutes a passive antenna tuned in frequency with a capacitor according to the invention.

Thanks to the invention:
The capacitor plates are formed using the same technique as that used for producing the antenna;
The invention makes it possible to obtain wire antennas that are more efficient than the antennas obtained by chemical etching or electrochemical growth of conductive surfaces;
The construction of an antenna and an associated capacitor is extremely simplified since it uses a single wire technique (embroidery, inlay . . . )
The invention provides a good RF coupling with a less extensive loop and a smaller turn surface, it has the advantage of avoiding delamination problem while freeing the entire standard embossing area reserved for embossing.

Other features and advantages of the invention will become apparent upon reading the following description given by way of non-limiting example, and with reference to the accompanying drawings in which.

Figure 1:
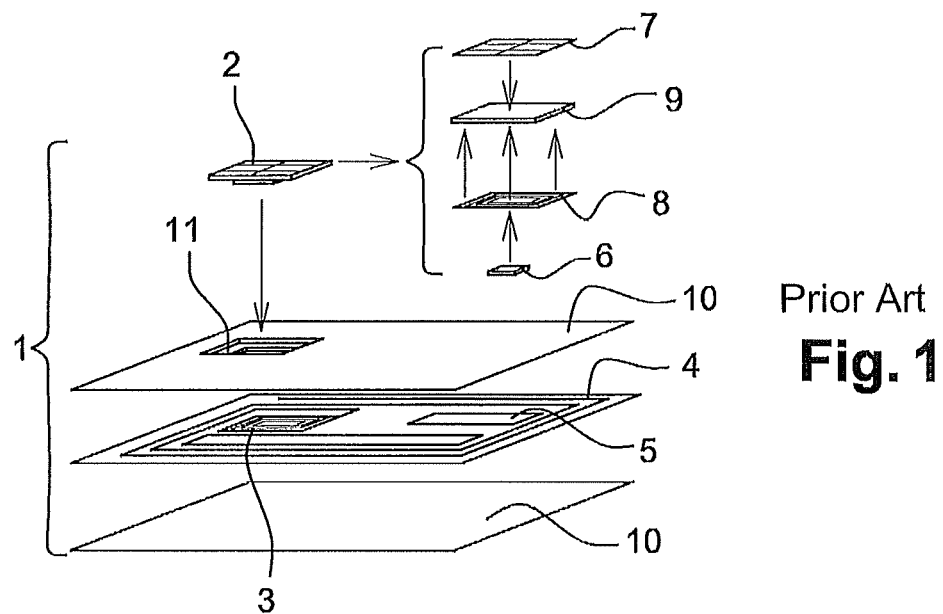
FIGS. 1 and 2 illustrate a dual interface smart card according to the prior art.
Figure 2:
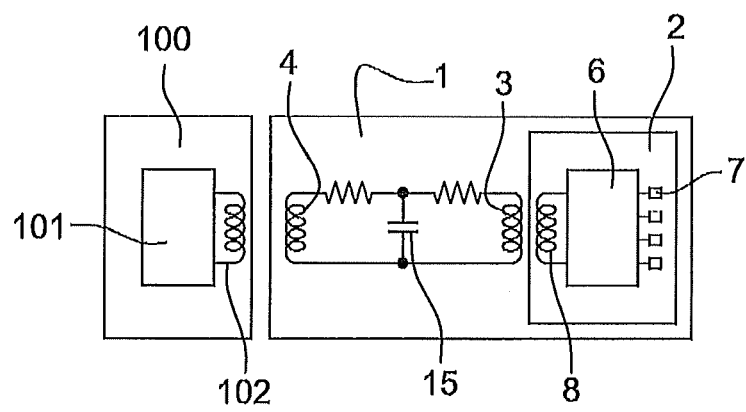

FIGS. 1 and 2 of the prior art have been described above in the introduction. The passive antennas are respectively referenced 3, 4 and 13, 14. It includes a small loop 3, 13 and a large loop 4, 14 respectively linked to a capacitor 15 comprising two plates, among which the one referenced 5 (the other plate being positioned on the opposite face of the antenna substrate).

Figure 3:
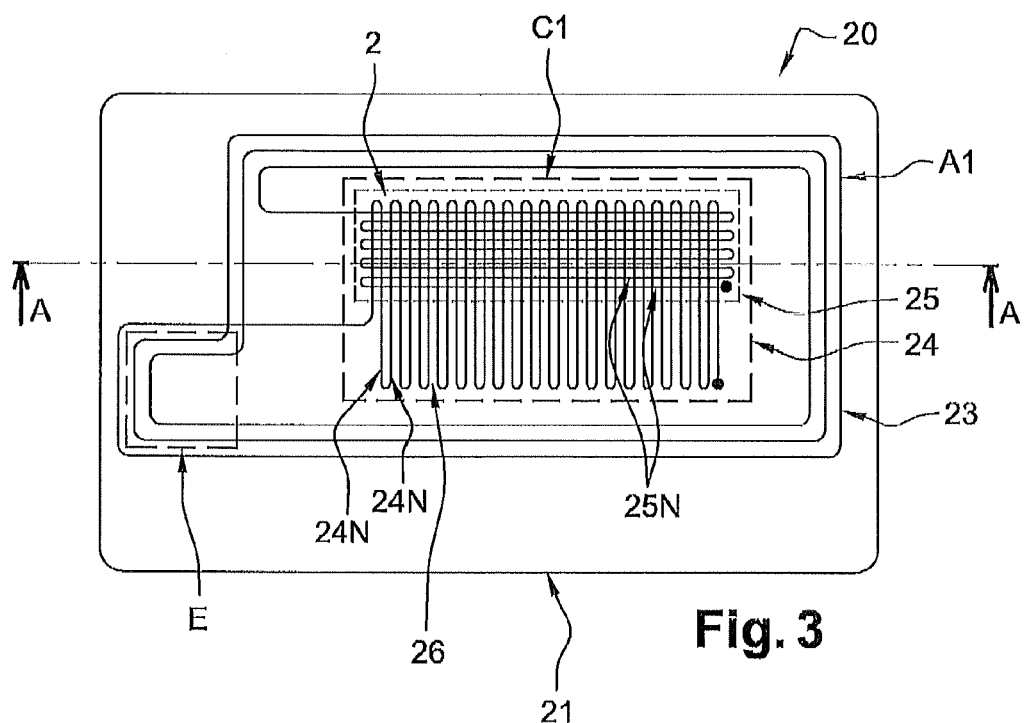
FIG. 3 shows a schematic view of the device according to an embodiment of the invention.

FIG. 3 illustrates a first embodiment of an RF device 20 according to the invention; it includes the capacitor C1, produced according to an alternative solution of the invention and linked or intended to be linked to a radio frequency antenna A1, for resonance frequency tuning. The capacitor and the antenna are based on an insulating substrate 21 more particularly made of plastic, paper, etc.

This device 20 is, in this example, a contactless or hybrid with electric contacts and contactless smart card in compliance with ISO 7816 and/or ISO/IEC 14443 standard. The antenna comprises a radio frequency transponder location E (not shown). Such a module comprises a radiofrequency integrated circuit chip linked to a transponder antenna. The module preferably has the shape of a dual interface smart card module, with contacts (ISO 7816) and contactless; it is coupled to the passive antenna A1 by electromagnetic coupling.

The device can, however, be an insert (inlay) for an electronic passport or any other contactless object such as an electronic label, a badge, a transportation ticket, etc. In this case, other cover sheets may complete it in a known manner.

The capacitor C substantially comprises an equivalent to a first 24 and second conductive plates 25 facing one another and separated from an insulator.

According to one characteristic, at least one plate 24 or 25 is formed by several portions of the wire conductor deposited in a guided manner onto a substrate. Preferably, the wire is coated with a sheath and/or an insulator. The insulator is formed by at least the sheath or the sheath and the insulating material of the substrate.

The wire portions 24N can form, as in the example here, parallel layers or in other cases spirals or any other forms (FIG. 5); the layers are for example obtained by sweeping a conductive wire 24N more particularly while forming a zigzag on one surface of the substrate. The spacing between the wire portions (FIG. 4) is for example 200 to 400 microns for wires of 50 to about 100 microns in diameter, i.e. about 2 to 5 times the diameter of a wire.

In the plan view, the plate 24 or at least the equivalent thereof, has alternate layers of strips of substrate 26 and wire portions 24N, placed side by side. These plates are perforated between the wire portions. They also form a kind of wire grid.

Figure 4:
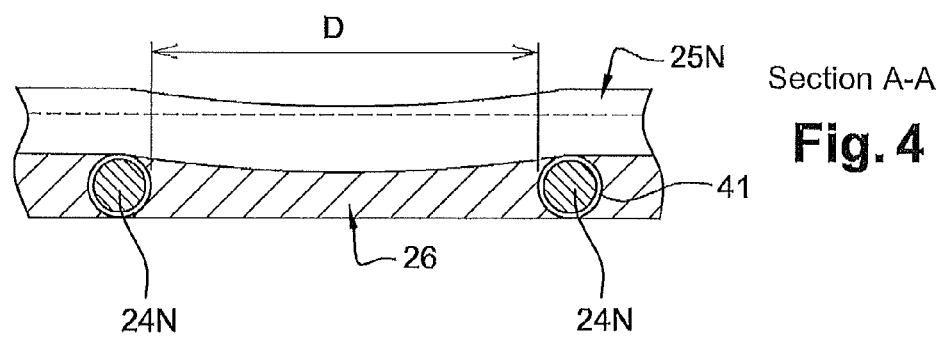
FIG. 4 shows a partial cross-sectional view of the capacitor of FIG. 3.

FIG. 4 illustrates a partial cross-section A-A of the capacitor C1; the wire portions 24N forming the lower capacitor plate 24 may preferably be substantially buried in the plastic medium 21 whereas the wire portions of 25N forming the upper plate 25 are hardly buried at the crossings but they are partly at the residual portions of the substrate located between the wire portions 24N. Here, the substrate portion used for fixing the wire 25N has a distance D between the portions.

Where appropriate, at least one plate is formed by a path having a circular 34, or rectangular, triangular shaped spiral. In FIG. 4, the lower plate is a spiral whereas the upper plate is formed as a zigzag like radii of a circle containing the plate 34.

Figure 5:
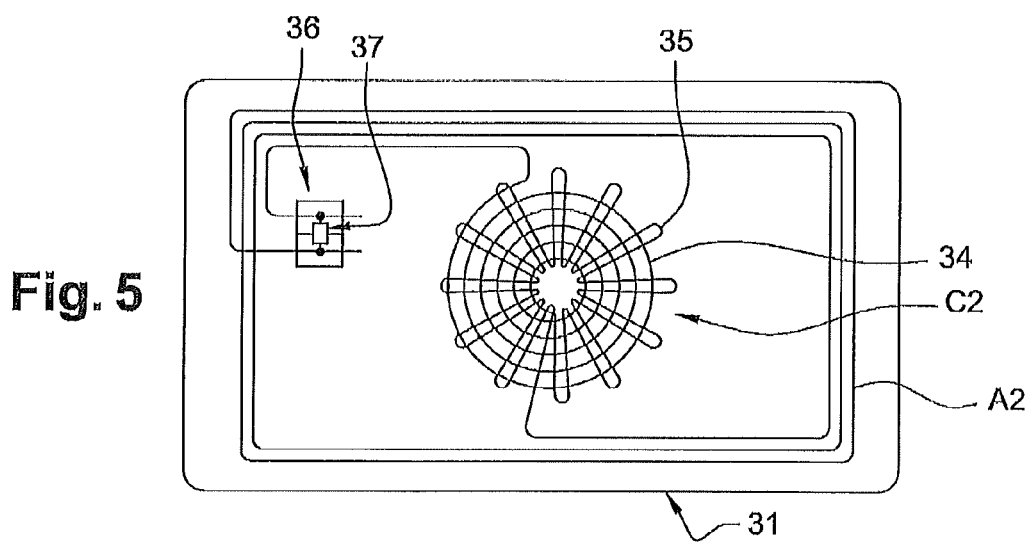
FIG. 5 shows a schematic view of an alternative embodiment of a device according to the invention.

The device of FIG. 5 is or comprises a radio frequency transponder such as an insert for a contactless smart card. It comprises a substrate 31 as above and a radio frequency module having a radio frequency chip 37 connected to an antenna A2 carried by the substrate.

The capacitors are separated from the antenna paths in that the paths are located in distinct locations of the antenna turns.

The plates of the invention preferably comprise one terminal bond or two, for connection to an electric or an electronic component, in particular to a radiofrequency antenna. The invention does not exclude to link the capacitor to other components even not RF ones.

The plates may have different surfaces so as to allow an adjustment of the capacitor. The upper plate has here substantially the same surface as the lower plate unlike the example of FIG. 3, wherein the lower plate is significantly wider.

The plates may be formed on the same substrate or on two different substrates and then assembled, the plates may be formed side by side on the same face of the substrate, and the substrate is then folded to have the plates facing one another.

According to one feature, the wires of the two plates are placed on the same side of the substrate for simplicity of implementation. In a first step, the first plate (or grid) of a capacitor with a wire according to any pattern, preferably a rectangular one, is formed in a guided manner on a substrate; in a second step, the second plate is formed with the same plate pattern but by depositing the wire portions onto the first plate so that the deposited wire portions cross the wires of the first plate.

Plates may also be produced with wire portions of a plate that do not cross the wire portions of the other plate, for example, because they are parallel or with portions interleaved with one another and very close to each other, more particularly with a shape of "Us" interleaved with one another.

The wires of the first plate cross the wires of the second plate in a substantially perpendicular or oblique way; the wires of the first plate are attached to the substrate in areas of the substrate not covered by the wires of the first plate.

If necessary, the thread is attached to the substrate and/or to the wire of the first plate by an adhesive provided with the wire or otherwise provided from outside. Heat energy is added by blowing or ultrasound to fix the capacitor plate wire on the substrate and/or the wire.

In the example, the wires are deposited by ultrasonic inlay onto the substrate, however other wire technologies such as embroidery or sewing may be fit, too.

The wire portions of the two plates in FIG. 5 are deposited on the same side of the substrate 31.

In other alternative embodiments, the invention provides to build capacitors in series by multiplying the stacked plates. These plates or grids may be formed with a continuous wire path.

Furthermore, the invention provides for plates or grids stacked on the path of the antenna turns.

Thus, a series assembly of capacitors is obtained either by stacking at least three plates, or by making at least two capacitors stacked on a path of the same turn (or the same conductive track if there is no antenna).

For example when making a turn, the tool guiding the wire on the substrate makes a plate having a zigzag shape or any grid shape, and then the wire of a second winding or a subsequent winding of the second turn makes the second plate and/or other subsequent plates to have capacitors in series with each other.

The advantage of a series capacitor is that it increases the area devoted to the plates.

Alternately, after completing a first plate, the invention provides for the second plate or the $n^{th}$ plate to be produced immediately after the first one with a continuous wire, for example by making the wire run on the grid that has just been formed before continuing the antenna path.

In the case of an ultrasonic inlay, it is not necessary to raise the ultrasonic tool or to stop ultrasound at each crossing of the wire.

Advantageously, in FIG. 3 or 4, the antenna and at least one capacitor plate are formed with the wire deposited in a guided manner onto a substrate. Here the two plates and the antenna are made by a continuous path of the wire on the same face if the substrate without changing the tool.

The device comprises, in the present example, a passive antenna 23 tuned or intended to be tuned in frequency with at least a radio frequency transponder 22.

Generally, in the context of the present description, transponder means any radio frequency electronic circuit communicating through an electromagnetic field and having a coil connected to a capacitor and/or an integrated circuit.

Transponders are used in various fields of the economy, such as banking (e-wallet), communication, transportation, identity (e-passport, ID-card). In the field of identity, in particular, identifying a person by radiofrequency communication with a contactless electronic portable object of the RFID type is known.

The module may comprise or not an insulating substrate carrying contact pads and/or the antenna.

Figure 6:
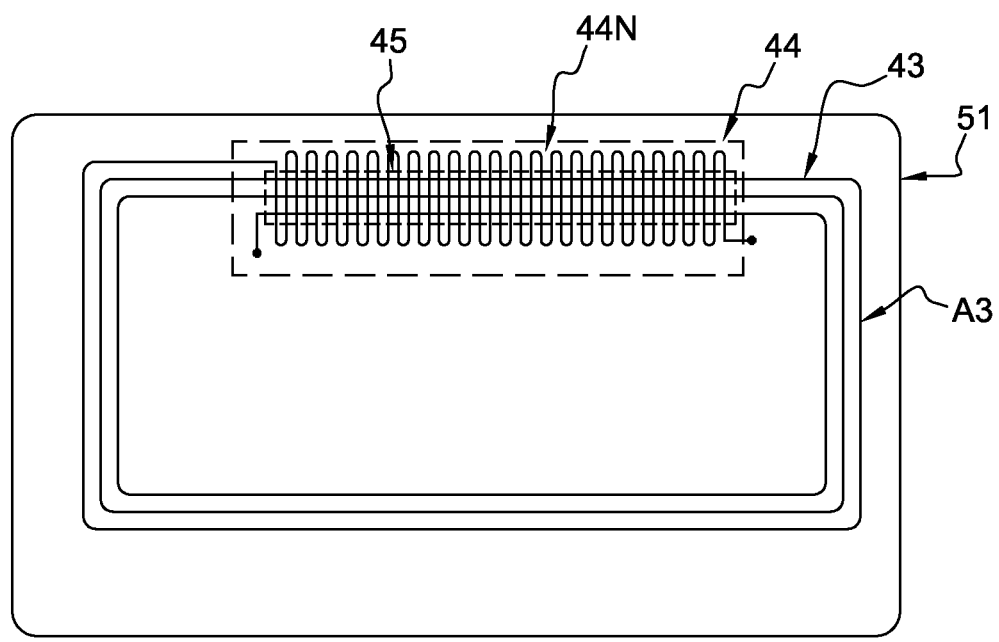
FIG. 6 shows a schematic of an alternative improved embodiment of a device according to the invention.

FIG. 6 shows an optimized alternative embodiment of the invention. It aims to achieve a wire capacitor 44, 45 more particularly by inlay of wire or embroidery without adding extra material to the one used for the antenna.

A capacitor plate 44 is formed by layers 44N on the turns of the antenna A3. All the portions of the turns located opposite the layers form the other plate 45 of the capacitor.

During the production or at the beginning or the end of making an antenna turn on a substrate 51 (e.g. in the standard smart card format), the tool used for guiding and fixing the antenna wire makes the antenna A3 turns cross each other by making multiple layers or zigzags 44N on the turns; the layers are for example oriented from the interior to the exterior of the antenna A3.

A capacitor is thus formed with a first plate 44N formed by several continuous layers (at least two or at least five) of the wire crossing a portion of the antenna turns.

The portion of the turns opposite the armature 44N forms the other capacitor plate. Thus, at least one of said first and second plates is formed astride the antenna A3 by crossing antenna turns.

The capacitor here is of the parallel type, but other arrangements make it possible to obtain a capacitor in series.

Costs are significantly reduced as compared to other technologies used for making this antenna (etching, aluminum antennas, materials additive or subtractive technique, printed circuits).

The wire technology, more particularly the buried wire technology has never been used to make an aerial relay (or of the passive type for amplification), especially because it is very difficult to do so.

The invention makes it possible to obtain a wire antenna more particularly with buried wire on a substrate, with any wire diameter or shape factor, with any kind of loop, any inter-turn spacing and any dimension.

The invention of this alternative embodiment consists in creating one or more capacitors with the antenna turns.

The insulated copper wires making it possible to create more particularly parallel capacitors, on the terminal portions of the antennas without short-circuit between the first and second capacitor plates thus formed.

The principle of this improved alternative embodiment may be extended to a (not passive) normal antenna to add a capacitor to an existing transponder in order to improve the radio frequency performances (for example, adding a wire capacitor to a transponder using a radiofrequency chip already incorporating a low value capacitor, will improve the RF performances thereof, especially for small antennas).

It makes it possible to have antennas whose overall surface is reduced by half as compared to conventional antennas in the ISO format bank cards.

This alternative embodiment has the advantage of improving the rate of the antenna producing machines and the output thereof since there is only one area in zigzag. Besides, there is no or less ghost (a mark visible to the naked eye by relief or transparency) on the final card since the capacitor is made in the area of the turns of the antenna itself.

The invention claimed is:

1. A radio frequency device comprising an antenna linked to a capacitor, with said capacitor comprising a first and a second conductive plates facing each other and separated by an insulator, with at least one said first and second plates being formed by several portions of the wire conductor, characterized in that the antenna and at least a capacitor plate are formed with wire portions deposited in a guided manner onto a substrate.

2. A device according to claim 1, wherein the portions are deposited in a guided manner onto a substrate.

3. A device according to claim 1, wherein said wire portions form parallel layers or spirals.

4. A device according to claim 1, wherein the wire portions of the two plates are deposited on the same side of the substrate.

5. A device according to claim 1, wherein the wire portions of the first plate cross the wire portions of the second plate so as to be substantially bound to the substrate in substrate zones not covered by the wire portions of the first plate.

6. A device according to claim 1, wherein the wire portions are deposited by embroidery or overlay on the substrate.

7. A device according to claim 1, wherein it comprises an assembly of capacitors in series obtained by stacking at least three grids or plates, either by making at least two stacked on a path of the same turn or of a track.

8. A device according to claim 1, wherein at least one of said first and second plate is formed astride the antenna by crossing antenna turns.

9. A device according to claim 1, wherein the antenna and at least one capacitor plate are formed continuously using the same continuous wire.

10. A radio frequency device according to claim 9, wherein it comprises an assembly of capacitors in series obtained either by stacking at least three plates, or by making at least two capacitors stacked on a path of the same turn or a track.

11. A radio frequency device according to claim 1, wherein it constitutes a passive antenna tuned in frequency.

* * * * *